United States Patent [19]

Tsuru

[11] 4,348,875
[45] Sep. 14, 1982

[54] CLOSURE MEMBER FOR AN AUTOMOTIVE DRIVE SHAFT ASSEMBLY

[75] Inventor: Mario Tsuru, Yokosuka, Japan

[73] Assignee: Nissan Motor Co., Ltd., Yokohama, Japan

[21] Appl. No.: 160,713

[22] Filed: Jun. 18, 1980

[30] Foreign Application Priority Data

Jun. 23, 1979 [JP] Japan ................................. 54-86230

[51] Int. Cl.³ .............................................. F16C 1/06
[52] U.S. Cl. ..................................... 464/170; 277/82; 138/89
[58] Field of Search ....................... 64/32 F, 32 R, 3, 8, 64/21, 22; 277/65, 82, 207 R, 207 A, 212 R, 212 F, 212 FB, 229, 237 R, 237 A; 74/18, 18.1, 18.2; 138/89; 285/225, DIG. 2

[56] References Cited

U.S. PATENT DOCUMENTS

| | | | |
|---|---|---|---|
| 2,896,979 | 7/1959 | Stephens | 277/82 |
| 3,137,243 | 6/1964 | Beck et al. | 64/21 |
| 3,169,809 | 2/1965 | Pendleton | 277/82 |
| 3,464,232 | 9/1969 | Hutchinson | 64/21 |
| 3,557,572 | 1/1971 | Auckfor et al. | 64/21 |
| 4,112,979 | 9/1978 | Widdicombe | 138/89 |

FOREIGN PATENT DOCUMENTS

| | | | |
|---|---|---|---|
| 2330539 | 1/1974 | Fed. Rep. of Germany | 64/32 F |
| 1558967 | 1/1980 | United Kingdom | 138/89 |

*Primary Examiner*—P. S. Lall
*Attorney, Agent, or Firm*—Thompson, Birch, Gauthier & Samuels

[57] ABSTRACT

In an automotive drive shaft assembly including a joint housing with a flanged, open end, there is provided according to the present invention a closure member for closing the open end, which closure member comprises a covering portion placed on the outer side face of the flange. The periphery of the covering portion is formed with a plurality of arms defining cantilever springs and the free ends of the arms are inturned to define detents engaging the inner side face of the flange. The closure member can be readily installed on the flange with a snap or resilient action to close the open end.

4 Claims, 3 Drawing Figures

CLOSURE MEMBER FOR AN AUTOMOTIVE DRIVE SHAFT ASSEMBLY

BACKGROUND OF THE INVENTION

The present invention relates in general to automotive drive shaft assemblies including joints such as slip joints or constant velocity universal joints and more particularly to covers or closure members for closing the open ends of such joints.

As is well known, some joints in drive shaft assemblies have open ends which need to be closed by closure members in order to retain lubricant such as grease within the joints and to prevent the ingress of dirt and moisture during the storage and the conveyance of the assemblies.

A prior art automotive drive shaft assembly 10 equipped with such a closure member is illustrated in FIG. 1 as comprising a drive shaft 12 and a joint 14 having a hollow generally cylindrical joint housing 16. One end the joint housing 16 is formed with a flange 18 for bolting to a flanged shaft (not shown). The flange 18 is provided with bores 20 for receiving fitting bolts. The end of the joint 14 remote from the flange 18 is closed by a flexible sealing muff or boot 22 attached by retaining rings 24 (only one is shown and designated) to the drive shaft 12 and to the end of the joint housing 16. The other end of the joint 14 adjacent the flange 18 is closed by a cover or closure member 26 which is placed on the outer side face of the flange 18. The closure member 26 is provided with bores 28 capable of being aligned with the bores 20 in the flange 18, respectively and attached by bolts 30 and nuts 32 to the flange. In installing the assembly 10 on a vehicle, the closure member 26 is attached to the foregoing flanged shaft together with the joint housing 16, being interposed between the mating flanges.

The drive shaft assembly thus described and shown has the disadvantage that its installation on a vehicle is complicated by the necessity to remove the bolts 30 and the nuts 32, resulting in a relatively expensive installation cost.

Other known closure members include a pressed-in type and a screwed-in type. However, the pressed-in type closure member has the disadvantage that it requires a high demensional accuracy, and the screwed-in type closure member has the disadvantage that it requires a costly thread cutting, both resulting in a relatively expensive manufacturing cost.

A yet other closure member is also known which is provided with a plurality of plastically deformable, elongated extensions which, in assembling the closure member to a corresponding flange, are plastically bent in a manner to engage, at the free ends thereof, the inner face of the flange and thereby attach the closure member to the flange. However, this closure member has the disadvantage that the bending of the extensions must be made at the very time when the closure member is attached to the flange and furthermore the closure member of this type tends to have play relative to the flange.

It is accordingly an object of the present invention to provide an automotive drive shaft assembly including a joint and an improved and novel closure member for closing an open end of the joint, which closure member is readily installed in place and which, once installed, remains so installed unless the removal thereof is intended.

It is another object of the present invention to provide an automotive drive shaft assembly including a joint and an improved and novel closure member of the above-mentioned character, which closure member is of unitary construction and adapted to be installed with a snap or resilient action.

It is a further object of the present invention to provide an automotive drive shaft assembly including a joint and an improved and novel closure member of the above-mentioned character, which closure member effects reduction in the manufacturing and installation expense of the drive shaft assembly.

BRIEF DESCRIPTION OF THE DRAWINGS

These and other objects and advantages of a drive shaft assembly for an automotive vehicle according to the present invention will become more clearly understood from the following description taken in conjunction with the accompanying drawings, in which.

DESCRIPTION OF THE PREFERRED EMBODIMENT

Figure 1:
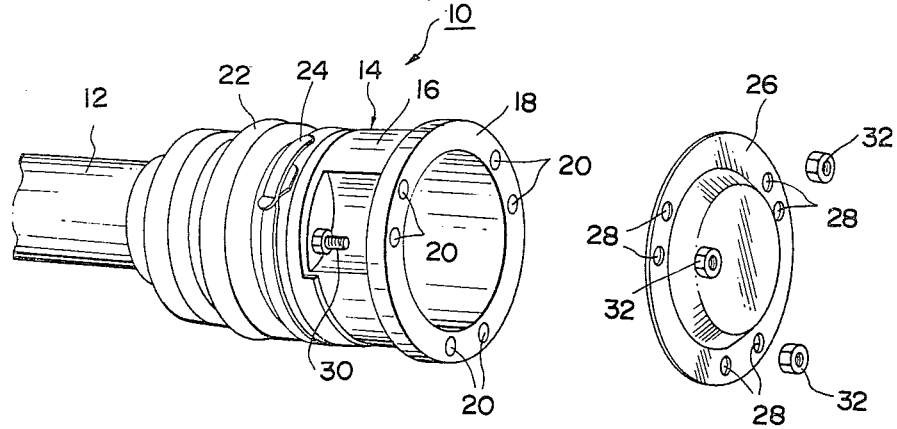
FIG. 1 is a perspective view partly exploded, showing a prior art automotive drive shaft assembly of the type with which the present invention is concerned.
Figure 2:
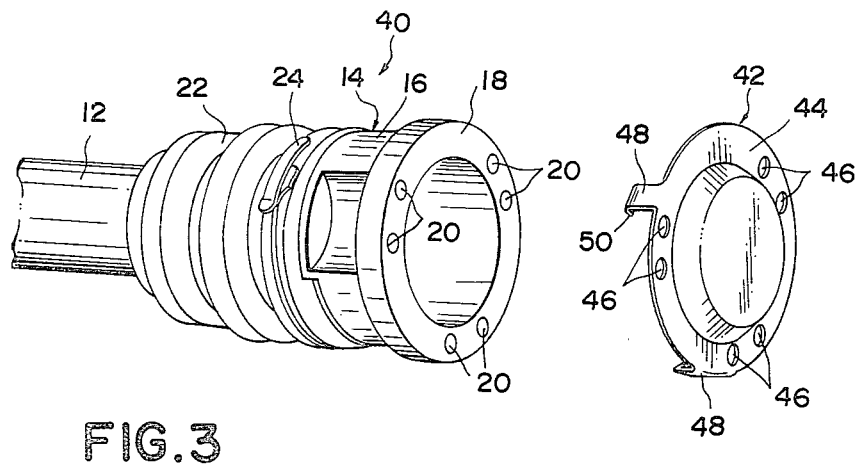
FIG. 2 is a view similar to FIG. 1 but showing an automotive drive shaft assembly according to the present invention.
Figure 3:
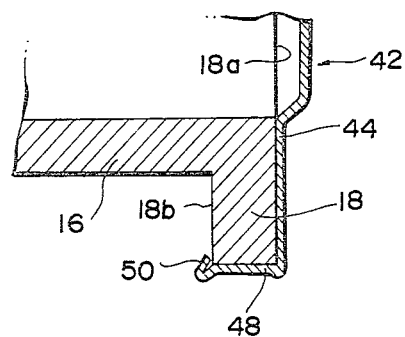
FIG. 3 is a fragmentary sectional view of the drive shaft assembly of FIG. 2, showing the closure member thereof in its installed or assembled condition.

Referring to FIGS. 2 and 3, an automotive drive shaft assembly generally designated by the reference numeral 40 is provided with an improved and novel closure member 42 according to the present invention, the remaining elements of the assembly being substantially similar to those of FIG. 1 and designated by the same reference numerals for the purpose of illustration only. The closure member 42, in its installed or assembled condition as shown in FIG. 3, comprises a covering portion 44 which extends over the open end of a joint 14 and the outer side face 18a of the flange 18. The covering portion 44 is provided with bores 46 which are respectively aligned with the bores 20 in the flange 18 when the closure member 46 is put in place on the outer side face 18a of the flange. The periphery of the covering portion 44 is integrally formed with a plurality of arms 48 which extend substantially perpendicular to the covering portion along the periphery of the flange 18 and which define cantilever springs supported by the covering portion. The free ends of the arms 48 are in-turned to define detents 50 each of which extends in inclined manner to present an edge opposed to and engaging the inner side face 18b of the flange 18. In installing or assembling the closure member 42 to the flange 18, the arms 48 spring outwards to allow the detents 50 of the arms to freely move on the periphery of the flange toward the inner side face 18b. When the detents 50 reach the inner face 18b of the flange 18, the arms 48 spring inwards to engage the detents with the inner side face and at the same time the covering portion 44 abuts upon the outer side face 18a of the flange. The closure member 42 is of unitary construction and formed by pressing out of sheet metal or formed by injection moulding out of plastics.

From the foregoing, it is to be understood that according to the present invention an automotive drive shaft assembly is provided with a closure member 42 for closing an open end of a joint, which closure member is readily installed in place with a snap or resilient action and without requiring bolts and nuts, thus remarkably improving the installation work for installing the drive shaft assembly on a vehicle as well as the installation work of installing the closure member itself to the flange.

It is to be further understood that the closure member 42, once installed, remains so installed unless the removal thereof is intended, thus positively and assuredly performing its function in retaining lubricant within the joint and preventing the ingress of dirt and moisture during the conveyance of the drive shaft assembly or during the storage of the assembly alongside the vehicle assembly line.

It is to be yet further understood that even when the closure member 42 is disassembled when repairing or servicing the drive shaft assembly, it can be reassembled without impairing its original function.

Obviously, many variations and modifications of the present invention are possible in light of the above teachings. It is, therefore, to be understood that within the scope of the appended claims the invention may be practiced otherwise than as specifically described.

What is claimed is:

1. In an automotive drive shaft assembly having a joint housing with a flanged, open end, a closure member for closing the open end, being of unitary construction and comprising a covering portion extending over the open end and engaging the outer side face of the flange, the periphery of the closure member being formed with a plurality of arms extending substantially perpendicularly to the covering portion along the periphery of the flange and defining cantilever springs supported by the covering portion, free ends of the arms being inturned to define detents engaging the inner side face of the flange.

2. In an automotive drive shaft assembly including a joint having a hollow joint housing which is formed with a flange at one end thereof, a closure member for closing an open end of the joint adjacent the flange, being of unitary construction and comprising a covering portion extending over the open end of the joint and engaging the outer side face of the flange and defining cantilever springs supported by the covering portion, the free ends of the springs being inturned to define detents each of which extends in inclined manner to present an edge opposed to and engaging the inner side face of the flange.

3. In an automotive drive shaft assembly having a joint housing with a flanged open end, the flange being formed with a plurality of holes for receiving attaching bolts, a closure member for closing the open end, said closure member being formed as a unitary stamping from sheet metal and comprising a covering portion extending over the open end and engaging the outer side face of the flange, the covering portion being formed with a plurality of openings aligned with the holes in the flange of the joint housing, the periphery of the closure member being formed with a plurality of arms extending substantially perpendicular to the covering portion along the periphery of the flange and defining cantilever springs supported by the covering portion, the free ends of the arms being inturned to define detents engaging the inner side face of the flange.

4. In an automotive drive shaft assembly having a joint housing with a flanged open end, the flange being formed with a plurality of holes arranged in a circular array for accommodating therein attaching bolts, a closure member for closing the open end, said closure member being formed as an injection molded plastic piece and having a unitary construction, the closure member comprising a covering portion extending over the open end and engaging the outer side face of the flange, the covering portion being formed with a plurality of openings aligned with the holes in the flange of the joint housing, the periphery of the closure member being formed with a plurality of arms extending externally along the periphery of the flange and defining cantilever springs supported by the covering portion, the free ends of the arms being inturned to define detents engaging the inner side face of the flange.

* * * * *